(12) United States Patent
Levi

(10) Patent No.: US 6,202,807 B1
(45) Date of Patent: Mar. 20, 2001

(54) SPEED CONTROLLING HYDRAULIC DAMPENER

(76) Inventor: Avraham Y. Levi, 757 Decorah La., St. Paul, MN (US) 55120

(*) Notice: Subject to any disclaimer, the term of this patent is extended or adjusted under 35 U.S.C. 154(b) by 0 days.

(21) Appl. No.: 09/298,624

(22) Filed: Apr. 23, 1999

(51) Int. Cl.[7] .................................................. F16F 9/56
(52) U.S. Cl. ........................... 188/282.7; 188/282.1; 188/282.8; 188/287; 188/304; 188/318; 188/319.2
(58) Field of Search .............................. 188/266.2, 266.4, 188/266.5, 280, 281, 282.1, 282.7, 282.8, 285, 286, 287, 304, 305, 317, 318, 319.1, 319.2, 320; 267/64.11, 64.15, 64.25, 64.28

(56) References Cited

U.S. PATENT DOCUMENTS

| | | | | |
|---|---|---|---|---|
| 2,917,303 | * | 12/1959 | Vierling | 188/314 |
| 4,139,182 | * | 2/1979 | Nagase et al. | 188/285 |
| 4,591,031 | * | 5/1986 | Kirst | 188/287 |
| 5,361,706 | * | 11/1994 | Kunczynski | 188/312 |
| 5,388,711 | * | 2/1995 | Hodges | 188/287 |

* cited by examiner

Primary Examiner—Matthew C. Graham
Assistant Examiner—Thomas A. Williams
(74) Attorney, Agent, or Firm—Nikolai, Mersereau & Dietz, P.A.

(57) ABSTRACT

A speed controlling hydraulic dampener comprises a tubular housing defining a closed cylindrical chamber for containing a hydraulic fluid. The chamber containing two separate pistons and piston rods that extend through sealed openings in the ends of the housing. The second piston is spring-biased. First and second orifices are provided in the wall of the housing which are connected by a tubular passageway. A special seal arrangement cooperates with the first piston rod and with the wall of the housing defining the cylindrical chamber. This seal includes a third orifice extending longitudinally therethrough and cooperating with this orifice is a flow-controlling needle valve that can be used to adjust the rate of flow of hydraulic fluid from a first portion of the chamber through the first orifice, the tubular passageway and the second orifice to a zone between the first and second pistons.

9 Claims, 3 Drawing Sheets

SPEED CONTROLLING HYDRAULIC DAMPENER

BACKGROUND OF THE INVENTION

I. Field of the Invention

This invention relates generally to devices for controlling the rate at which a movable object is allowed to move relative to a fixed object, and more particularly to an improved design for a hydraulic dampener that is positionable between the movable object and the fixed object.

II. Discussion of the Prior Art

A variety of hydraulic dampening devices have been used in the past to limit the speed with which an object acted upon by an applied force will move relative to a fixed body. For example, in U.S. Pat. No. 5,297,912, assigned to applicant, there is described a ladder rack assembly that is adapted to be mounted to the roof of a van or other type vehicle for transporting ladders on the rack. A four-bar linkage assembly that is adapted to be actuated by the rotation of an elongated handle allows the ladders to be transported from a first position on and parallel to the top of the vehicle to a second position along side the vehicle where they can be readily removed from the rack and carried away by a workman. As the weight of the ladder is brought over center on the rack, gravity suddenly, takes over which would cause the ladder on the rack to drop suddenly were it not for the inclusion of hydraulic dampeners to slow down the movement of the ladders relative to the stationary vehicle.

Hydraulic dampeners of the type described are also often found on machine tools, such as a vertical/horizontal band saws. In this application, a hydraulic dampener can be used to control the rate at which the assembly carrying the orbiting saw blade will move through the workpiece as cutting takes place.

To achieve smooth and effective control, it is imperative that the speed controlling hydraulic damper not leak hydraulic fluid because when that hydraulic fluid is replaced by a compressible medium (air) erratic movement takes place. Rather than a smooth unidirectional descent, the movable object may bounce or oscillate. Ultimately, seal failure can lead to an uncontrolled descent, a situation to be avoided.

To avoid loss of hydraulic fluid and attendant air entry into the cylinder of the hydraulic dampener, it is required that there be an effective seal between the piston rod and the cylinder at the point where the cylinder rod exits the cylinder.

In prior art speed controlling hydraulic dampeners, as the piston rod is being drawn out from the cylinder, a vacuum is created because the volume in the cylinder formerly occupied by the piston rod is reduced. This, too, results in the introduction of air and a spongy performance when the piston is again driven back into the cylinder.

It is accordingly a principal object of the present invention to provide an improved speed controlling hydraulic dampener for controlling the movement of a fixed object relative to a stationary object.

Another object of the present invention is to provide a speed controlling hydraulic dampener having improved sealing structures for precluding the entry of air into the cylinder during actuations thereof.

Another object of the invention is to provide a speed controlling hydraulic dampener having means for compensating for the reduction in volume of hydraulic fluid in the cylinder as the cylinder rod is being drawn out from the cylinder to prevent the formation of a vacuum within the cylinder.

SUMMARY OF THE INVENTION

These and other objects and advantages of the invention are achieved by providing a hydraulic dampener that comprises a housing having first and second end caps defining a closed cylindrical chamber for containing a hydraulic fluid therein. A first piston rod extends through a bore formed in the first end cap and secured to the first piston rod is a first, main piston. A second piston rod extends through a bore formed in the second end cap and the second piston rod also supports a second, auxiliary piston that is disposed proximate one end thereof. A biasing means which may comprise a helical compression spring cooperates with the second end cap and second piston for biasing the second piston toward the first end cap. First and second longitudinally spaced orifices are formed in the wall of the housing defining the cylindrical chamber where the first is between a high pressure seal and an intermediate pressure seal on the first end cap and the second orifice is located in the zone between the first and second pistons. A tubular, hydraulic fluid conducting passageway extends between the first and second orifices. A means is provided for adjusting the rate of flow of hydraulic fluid through the first orifice and the tubular passageway into the zone between the main piston and the auxiliary piston when the first piston rod is moved in direction to reduce the spacing between the first piston and the first end cap. Finally, a one-way valve cooperates with the first piston for permitting return flow of hydraulic fluid from the zone between the main and auxiliary pistons into the space in the cylinder between the first piston and the first end cap when the first piston rod is moved in a direction to increase the spacing between the first piston and the first end cap.

A further feature of the improved speed controlling hydraulic dampener of the present invention resides in the structure whereby the rate of flow of hydraulic fluid through the passageway is made adjustable. A piston rod seal member forming a part of the first end cap is operatively disposed between the wall of the housing and the first piston rod for blocking flow of hydraulic fluid past the first end cap. The first end cap has an orifice formed therein that is fluid communication with the housing's first orifice, thereby reducing the high pressure generated between the piston and first end cap by the force pulling the piston rod outward down to the bias pressure created by the spring biased auxiliary piston acting on the hydraulic fluid in the zone between the two pistons. An adjustment screw extending through the first end cap cooperates with the orifice in the end cap for adjustably occluding hydraulic fluid flow therethrough into the first orifice and the passageway. The end cap seal members comprise a seal lantern including an annular groove that is formed in a peripheral surface thereof that aligns with the first orifice in the housing wall and a high pressure seal is supported by the seal lantern on one side of the annular groove with an intermediate pressure seal supported by the seal lantern on an opposite side of the annular groove. In this fashion, the pressure drop across the intermediate pressure seal as the piston rod is being forced into the cylinder is greatly reduced, minimizing the ability of ambient pressure air to enter the system and for hydraulic fluid to leak past the seal.

DESCRIPTION OF THE DRAWINGS

The constructional and operational features of the present invention will now be explained with the aid of the accompanying drawings in which like numerals in the several views refer to corresponding parts.

DESCRIPTION OF THE PREFERRED EMBODIMENT

Figure 1:
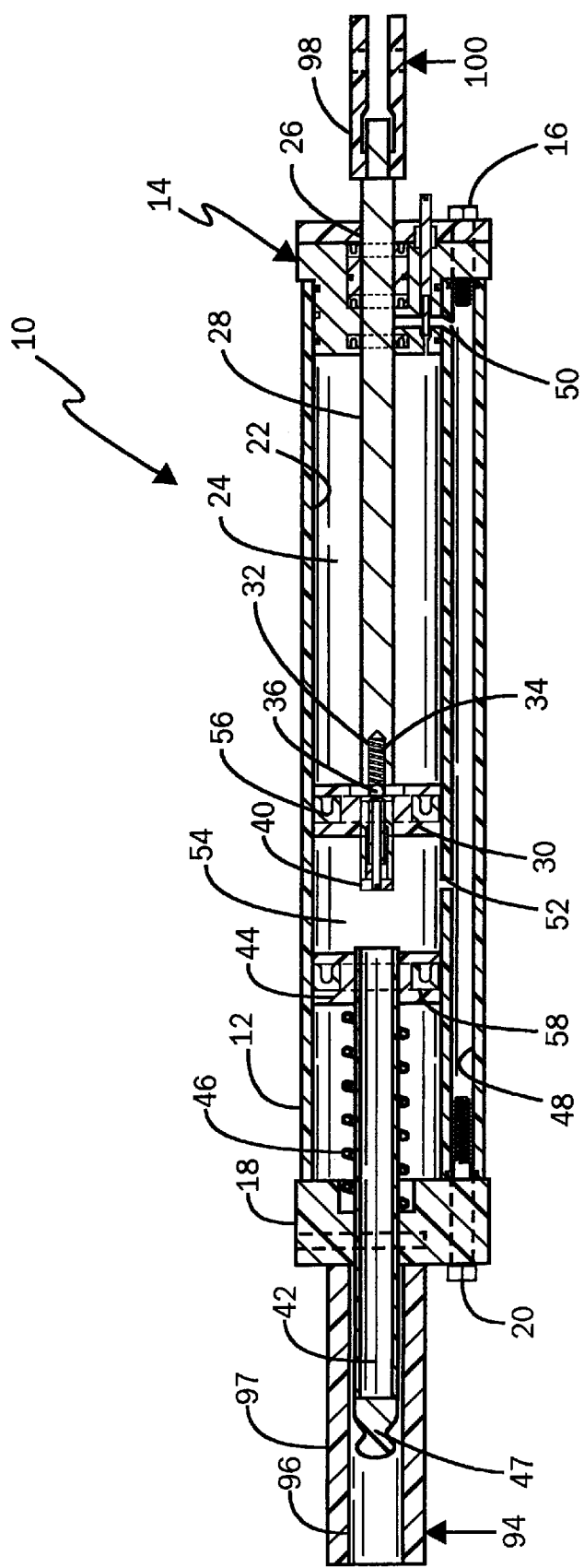
FIG. 1 is a longitudinal cross-sectional view of the speed controlling hydraulic dampener configured in accordance with the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring first to FIG. 1, there is indicated generally by numeral 10 a speed controlling hydraulic dampener constructed in accordance with the present invention. It is seen to include a cast aluminum housing 12 having a first end cap assembly 14 affixed to the right end of the housing 12 by four bolts, as at 16. Likewise, an end cap 18 is affixed to the left end of the housing 12 by bolts, as at 20. The housing 12 with its first and second end caps 14 and 18 define a closed cylindrical chamber 22 for containing a hydraulic fluid 24 therein.

The end cap 14 includes a cylindrical bore 26 and extending through this bore into the chamber 22 is a first piston rod 28 having a first piston 30 affixed to the end portion thereof. The piston rod 28 further includes a concentric bore 32 containing a compression spring 34 that normally urges a ball valve member 36 against a valve seat member 38 (FIG. 3) held in place by a bolt 40.

Extending through the second end cap 18 is a second, tubular piston rod 42 that has a second piston 44 secured to the rightmost end thereof. A compression spring 46 of a relatively high spring constant surrounds the piston rod 42 and cooperates with the second end cap 18 and the second piston 30 to normally urge the second piston 30 to the right when viewed in the drawings. A Zerk-type fitting 47 is affixed to the left end of the tubular piston rod 42, allowing injection of hydraulic fluid into the cylinder on an as-needed basis.

Figure 2:
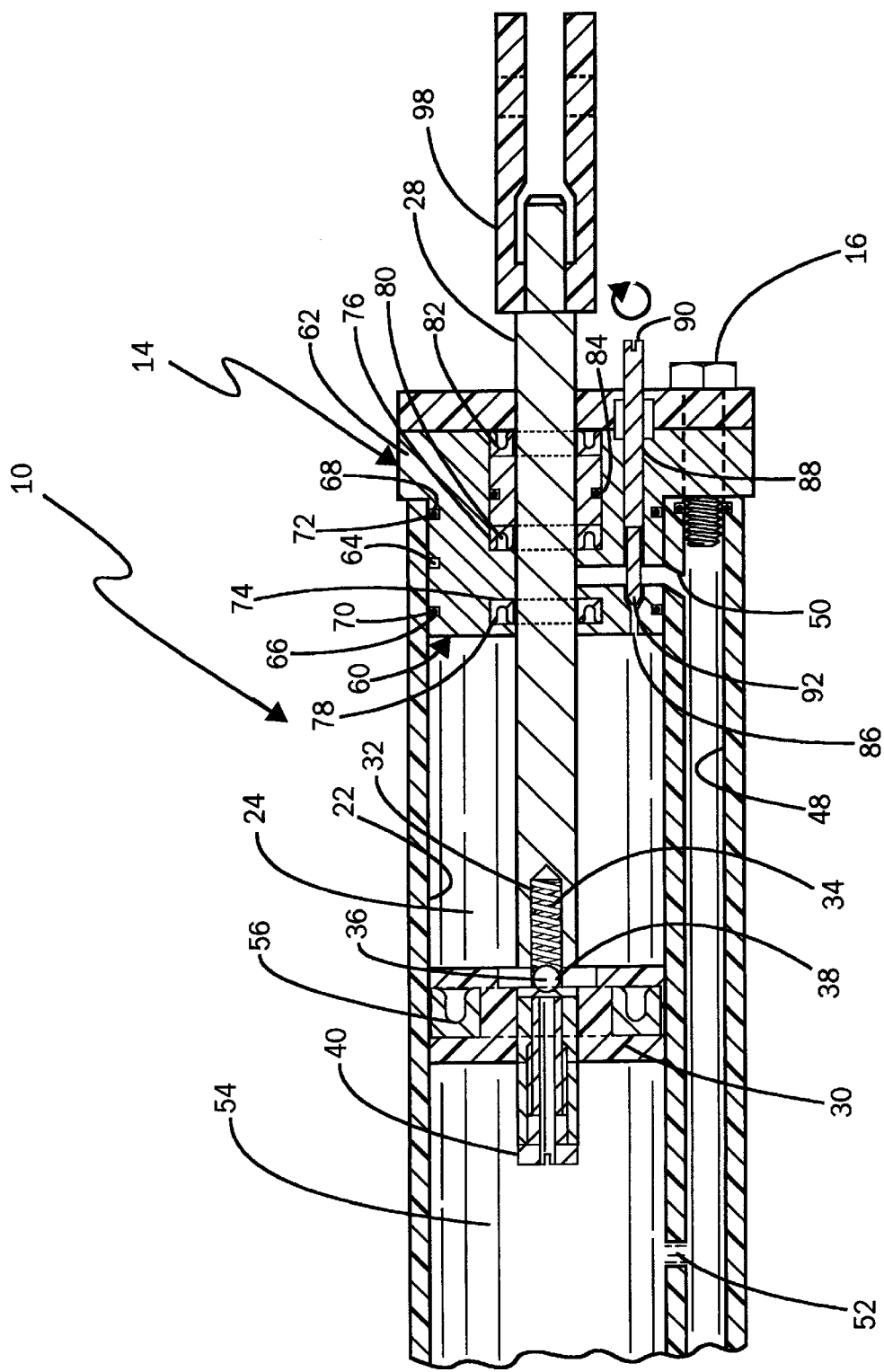
FIG. 2 is an enlarged partial view showing the main piston rod seal and speed controlling structure of the preferred embodiment of FIG. 1.
Figure 3:
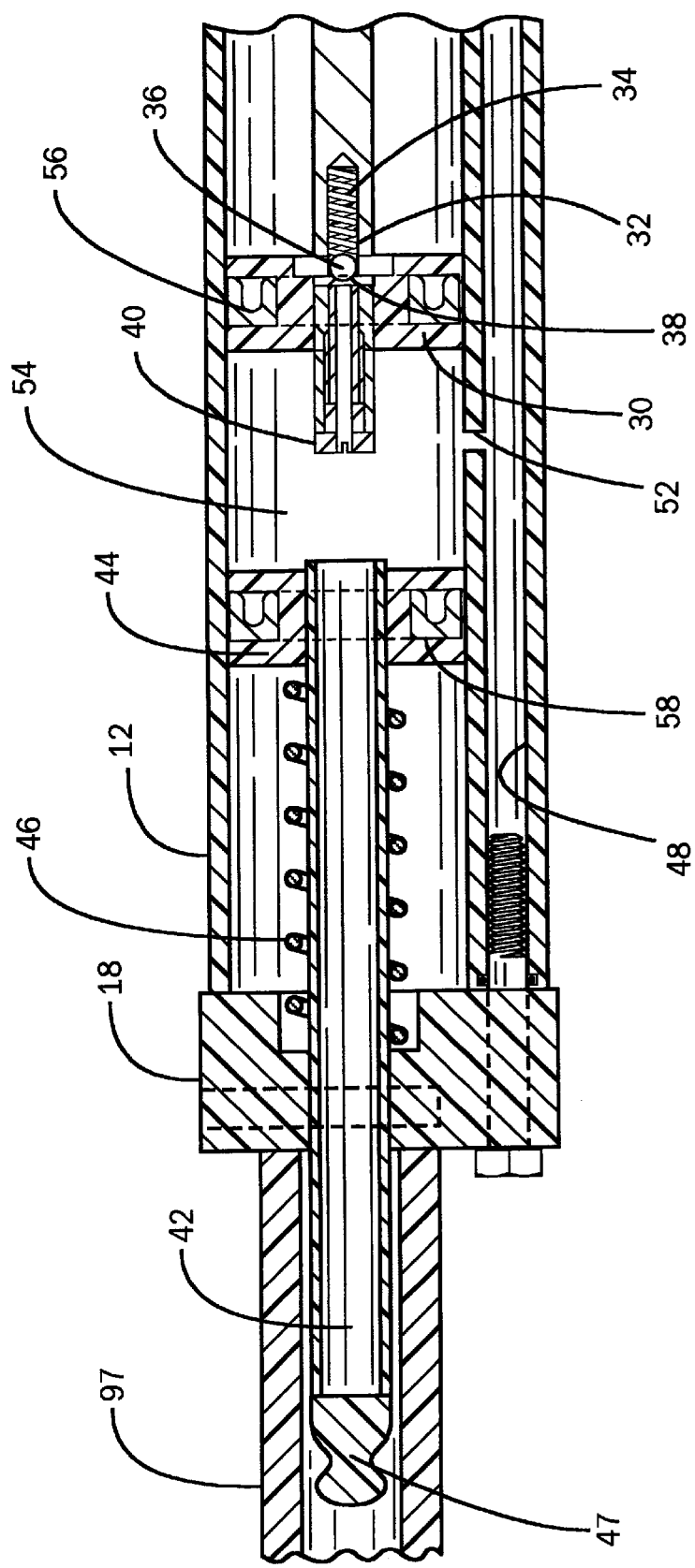
FIG. 3 is an enlarged partial section view of a left end portion of the preferred embodiment illustrated in FIG. 1.

Integrally formed with the housing 12 is a tubular, hydraulic fluid conducting passageway 48 that extends between and fluidly couples a first orifice 50 (FIG. 2) to a second orifice 52 (FIG. 3). The first orifice 50 is located proximate the first end cap assembly 14 while the second orifice 52 is aligned with a zone 54 between the main piston 30 and the auxiliary piston 44.

Considering next the seals incorporated into the speed controlling hydraulic dampener, each of the pistons 30 and 44 includes an elastomeric cup seal retained in annular grooves formed in the periphery of the pistons. The first or main piston 30 includes a cup seal 56 while the second piston 44 includes a cup seal 58. The cup seals 56 and 58 function to prevent passage of hydraulic fluid in the interface between the cylindrical wall 22 and the respective pistons.

Forming a part of the end cap assembly 14 at the right end of the housing is a mechanism for adjusting the rate of flow of hydraulic fluid through the first orifice 50 and the tubular passageway 48 into the zone 54, via orifice 52, when the piston rod 28 is pulled outwardly from the housing 12. It comprises a piston rod seal assembly, indicated generally by numeral 60, that includes a seal lantern 62 having an annular groove 64 formed in the periphery thereof where the groove 64 positionally aligns with the first orifice 50 when the end cap 14 is secured in place. Additional annular grooves 66 and 68 are formed in the periphery of the seal lantern 62 on opposed sides of the peripheral groove 64 and fitted into the grooves 66 and 68 are high and intermediate pressure O-rings 70 and 72, respectively, which serve to seal against the inner wall of the chamber 22. The high and intermediate pressure O-rings 70 and 72 serve to preclude flow of hydraulic fluid along the interface between the seal lantern 62 and the wall 22.

The seal lantern 62 includes a cylindrical bore for receiving the piston rod 28 therethrough and extending inwardly of the lantern from the bore are annular grooves 74 and 76 into which are fitted high and intermediate pressure annular cup seals 78 and 80, respectively.

The end cap assembly 14 includes yet a further cup seal member 82 that cooperates with the piston rod 28 as a wiper to prevent ingress of foreign objects, such as dust or other debris. A further intermediate pressure O-ring seal 84 is provided at the interface between the lantern 62 and the end cap assembly 14.

With continued reference to FIG. 2, it can be seen that the seal lantern 62 includes a longitudinal bore or orifice 86 that extends to and joins with the peripheral groove 62 which is aligned with the orifice 50. Threaded into a threaded bore 88 in the end cap assembly 14 is an adjustment screw 90 having a tapered tip 92 cooperating with the bore 86 as a needle valve. When the adjustment screw 90 is rotated clockwise, the conical tip 92 can be made to completely occlude flow of hydraulic fluid through the orifice or bore 86. When the screw is then backed-off from this position, the rate of flow of hydraulic fluid through the orifice 86, the orifice 50 and the fluid conducting passageway 48 as the piston 30 is moved to the right within the cylindrical chamber 22 can be adjusted.

OPERATION

Having described the constructional features of the speed controlling hydraulic dampener, consideration will next be given to its mode of operation.

The hydraulic dampener 10 will typically be connected between a fixed or stationary object, such as a frame or the like, and an object that is movable with respect to that frame. This is typically accomplished by passing a pin (not shown) through the aligned apertures 94 and through an aperture in the frame member inserted into the slot 96. Likewise, the movably member will have an apertured ear (not shown) inserted between the legs of a clevis or coupling 98 and with a pin (not shown) passing through the aligned apertures 100.

With the device as shown in FIG. 1, i.e., with the main piston rod 28 fully inserted into the chamber 22 and with a hydraulic fluid, such as hydraulic oil, filling the space between the first or main piston 30 and the seal assembly 60, as well as the zone 54 between the auxiliary low pressure piston 44 and the main high pressure piston 30 and with the passageway 48 also filled with oil, an equilibrium condition prevails with the coil spring 46 pushing the piston 44 against the oil in the zone 54.

Now, as the piston rod 28 is pulled outwardly of the cylinder through the bore 26 in the end plate assembly 14, the ball valve 36 will be seated and the oil 24 will be forced through the orifice 86, and via the annular groove 64 formed in the lantern 62, out the orifice 50 and into the passageway 48. The oil circulates through the passageway and through the orifice 52 into the zone 54 to increase the pressure therein and move the spring-loaded piston 44 to the left against the force of the spring 46.

Because the piston rod 28 is being pulled out from the chamber 22, there would be a decrease in pressure forcing oil through orifice 86 were it not for the auxiliary piston applying a force to the main piston through the volume of oil in the zone 54. The spring-loaded piston 44 moves to the right approximately $1/10^{th}$ the distance of movement of the piston 30, given that the cross-sectional area of the piston rod 28 is about $1/10^{th}$ of the cross-sectional area of the cylindrical bore 22. The rate of flow of oil from the main chamber between piston 30 and end cap 14 to the zone 54, via the passageway 48, is dependent upon the setting of the speed adjustment screw 90.

Now, after the piston rod 28 is fully extended and a force is applied to the clevis 98 to drive the piston rod 28 back into the cylinder, as the piston 30 moves to the left, the pressure on the ball valve 36 overcomes the force of the coil spring 34, displacing the ball valve from its seat and permitting the flow of hydraulic fluid from the zone 54 through the now-open ball valve 36 and back into the main chamber defined between the piston 30 and the end cap 14. The reduction in oil in the zone 54 reduces the pressure on the piston 44 allowing the spring 46 to move that piston to the right.

The passageway 48 connecting the orifice 52 to the annular groove 64, via orifice 50, serves to maintain the pressure within the groove at an intermediate pressure of the oil in the zone 54 relative to the higher pressure in the main chamber and ambient pressure. By providing high pressure seal elements 70 and 78 and intermediate pressure seal elements 72 and 80 disposed on opposite sides of the annular groove 64, leakage of oil along the interface between the seal lantern 62, the cylindrical wall of the housing and the piston rod is eliminated. As such, entry of ambient pressure air into the chamber is also eliminated. Thus, the speed controlling hydraulic dampener of the present invention does not become spongy with prolonged use, but continues to provide a smooth transition of the movable object secured to the clevis 98 with respect to a fixed object or frame connected to the tail piece 97 at a rate that can be set by the adjustment screw 90.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A speed controlling hydraulic dampener, comprising:
   (a) an elongated, tubular housing having first and second ends and a peripheral wall defining first and second cylindrical chambers, said first and second chambers being interconnected by first and second spaced-apart orifices;
   (b) a front end cap attached to the first end of the tubular housing, said front end cap including a cylindrical bore therethrough;
   (c) a rear end cap attached to the second end of the tubular housing for creating a sealed volume, said volume being filled with a hydraulic fluid, the rear end cap including a cylindrical bore;
   (d) a first piston rod extending through the cylindrical bore in the first end cap into the first cylindrical chamber and affixed to a main piston, the main piston having an annular seal for cooperating with the peripheral wall to inhibit flow of hydraulic fluid therebetween;
   (e) a second piston rod extending through the cylindrical bore in the second end cap into the first cylindrical chamber and affixed to a secondary piston, the secondary piston having an annular seal for cooperating with the peripheral wall to inhibit flow of hydraulic fluid therebetween, the second orifice being located in a zone between the main piston and the secondary piston;
   (f) means for resiliently biasing the second piston rod toward the first end cap;
   (g) seal means disposed on the first end cap for cooperating with the peripheral wall and the first piston rod for preventing passage of hydraulic fluid therealong, the front end cap including a third orifice leading to the second cylindrical chamber, via the first orifice;
   (h) a flow control needle valve adapted to cooperate with the third orifice in the front end cap member for selectively controlling the rate of flow of hydraulic fluid through said third orifice as the first piston rod is being withdrawn from the first cylindrical chamber through the cylindrical bore of the front end cap; and
   (i) a fourth orifice formed through the main piston and having a valve member cooperating therewith that seats against the fourth orifice as the first piston rod is being withdrawn from the first cylindrical chamber and which opens when the first piston rod is being returned into the first cylindrical chamber.

2. A speed controlling hydraulic dampener comprising in combination:
   (a) a housing having first and second end caps defining a closed cylindrical chamber for containing a hydraulic fluid therein;
   (b) a first piston rod extending through said first end cap into said chamber and having a first piston disposed proximate one end of said first piston rod;
   (c) a second piston rod extending through said second end cap into said chamber and having a second piston disposed proximate one end of the second piston rod;
   (d) compression spring biasing means cooperating with the second end cap and the second piston for biasing the second piston toward the first end cap;
   (e) first and second longitudinally spaced orifices formed in a wall of the housing, the second orifice being located in a zone between the first and second pistons and a tubular, hydraulic fluid conducting passageway extending between the first and second orifices;
   (f) a valve disposed in the first end cap and cooperating with the first orifice for adjusting the rate of flow of hydraulic fluid through the first orifice and tubular passageway into said zone when the first piston rod is moved a direction to reduce the spacing between the first piston and the first end cap; and
   (g) one-way valve means cooperating with the first piston for permitting return flow of hydraulic fluid from the zone when the first piston rod is moved in a direction to increase the spacing between the first piston and the first end cap.

3. The speed controlling hydraulic dampener of claim 2 wherein the second piston is moved in a direction to increase a force exerted by the biasing means as hydraulic fluid enters said zone.

4. The speed controlling hydraulic dampener of claim 3 wherein the valve for adjusting the rate of flow comprises:

(a) a piston rod seal member operatively disposed between the wall of the housing and the first piston rod for blocking flow of hydraulic fluid past the first end cap, the piston seal member having a orifice formed therein in fluid communication with the first orifice; and (b) an adjustment screw cooperating with the orifice in the piston rod seal member for adjustably occluding hydraulic fluid flow therethrough into the first orifice.

5. The hydraulic dampener of claim 3 wherein the piston rod seal member comprises:

(a) a seal lantern including an annular groove formed in a peripheral surface thereof that aligns with the first orifice;

(b) high pressure seal means supported by the seal on one side of the annular groove; and (c) low pressure seal means supported by the seal lantern on an opposite side of the annular groove.

6. The speed controlling hydraulic dampener of claim 2 wherein the one-way valve means comprises a bore formed through the first piston concentric with a bore formed into an end surface of the first piston rod, with a valve seat member fitted into the bore through the first piston, a spring fitted into the bore formed in the end surface of the first piston rod, and a ball valve member urged against the valve seat member by the spring.

7. The speed controlling hydraulic dampener as in claim 2 wherein the first and second pistons each include ring seals for cooperating with the wall of the cylindrical chamber to inhibit flow of hydraulic fluid in an interface between the first and second pistons and said wall.

8. The speed controlling hydraulic dampener as in claim 2 wherein the second piston rod is a tube.

9. The speed controlling hydraulic dampener as in claim 8 and further including a one-way valve fitted into a lumen of the tube through which hydraulic fluid can be introduced into the cylindrical chamber.

\* \* \* \* \*